(No Model.)
C. H. SNYDER.
FEED WATER PURIFIER.
No. 550,425. Patented Nov. 26, 1895.
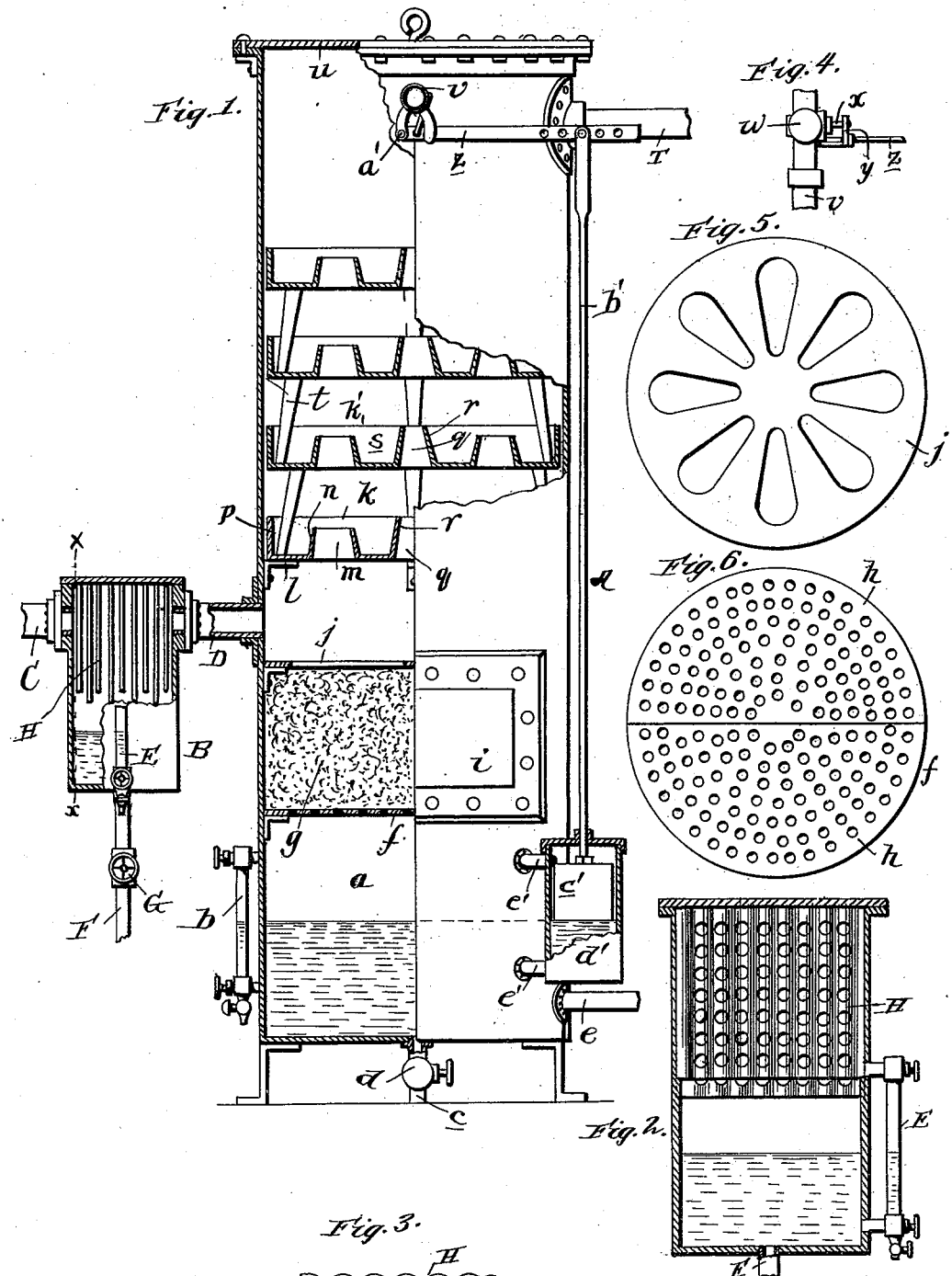
Witnesses:
C. H. Raider
K. F. Matthews.
Inventor
C. H. Snyder
By James Sheehy
Attorney

UNITED STATES PATENT OFFICE.

CHARLES H. SNYDER, OF JACKSON, MICHIGAN, ASSIGNOR TO THE MONITOR WATER PURIFIER COMPANY, OF SAME PLACE.

FEED-WATER PURIFIER.

SPECIFICATION forming part of Letters Patent No. 550,425, dated November 26, 1895.

Application filed August 5, 1895. Serial No. 558,309. (No model.)

*To all whom it may concern:*

Be it known that I, CHARLES H. SNYDER, a citizen of the United States, residing at Jackson, in the county of Jackson and State of Michigan, have invented certain new and useful Improvements in Filters; and I do declare the following to be a full, clear, and exact description of the invention, such as will enable others skilled in the art to which it appertains to make and use the same.

My invention relates to improvements in that class of apparatus for heating and purifying the water fed to boilers in which the exhaust-steam from an engine is utilized as the heating agent and all oil and grease is separated from the steam before it comes in contact with the water to be heated.

The novelty and advantages of my invention will be fully understood from the following description and claim when taken in connection with the accompanying drawings, in which—

Figure 1 is an elevation, partly in section, of my improved apparatus complete. Fig. 2 is a vertical section of the oil and grease separator. Fig. 3 is an end view of one of the plates of the said separator. Fig. 4 is a detail plan view of the valve for controlling the feed-water inlet. Fig. 5 is a detail plan view of the plate which rests above the filtering material and serves to retain the same in position, and Fig. 6 is a plan view of the sectional foraminated plate on which the filtering material rests.

Referring by letter to said drawings, A indicates the casing of my improved apparatus. This casing is formed of any suitable material capable of withstanding steam-pressure, and at its lower end is arranged the filtered-water chamber $a$, which is provided with a water-glass $b$, designed to indicate the height of the filtered water, and a drain-pipe $c$, having a cock $d$, and is designed to be connected by a pipe $e$ with a boiler. Above this chamber $a$, placed upon suitable supports, is the foraminated diaphragm $f$, which is designed to support the filtering material $g$ and is made in two sections $b$, as shown in Fig. 6, so as to permit of it being readily removed through the opening normally covered by the door $i$ when the filter is to be cleaned. The filtering material $g$, which may be any substance suitable to the purpose, is, as stated, placed on the diaphragm $f$, and it is retained in position and prevented from rising with the water by the suitably-supported plate or diaphragm $j$, which is preferably perforated in the manner better shown in Fig. 5, so as to permit free passage of the water to the filtering material.

$k$ indicates a pan which is supported upon lugs or other suitable supports $l$ at about the proportional distance illustrated above the plate $j$. This pan $k$ is provided with a plurality of openings $m$, surrounded by walls $n$, which are almost as high as the side walls $p$ of the pan, and it is also provided with a central opening $q$, surrounded by a wall $r$, quite as high as the said walls $p$. By virtue of this construction of pan it will be readily seen that pockets $s$ are formed for the reception of sediment, and that when water is fed into the pan it will pass in a thin film over the walls $n$ and $r$ and down through the openings $m$ $q$, while the sediment and foreign matter in said water will settle to the bottom of the pockets $s$.

$k'$ indicates a plurality of pans which are placed one above the other above the pan $k$, and are similar to said pan $k$, except that they are provided with legs $t$. All of these pans $k$ $k'$ are removably placed in position, and it will therefore be seen that when the cap-plate $u$ of the casing is disconnected said pans may be readily removed, so as to permit of them being easily cleansed.

$v$ indicates the feed-water-inlet pipe, which communicates with the interior of the casing A above the pans $k$ $k'$, as shown in Fig. 1. This pipe $v$ is provided with a valve $w$, which has a stem $x$, and to this stem is connected an arm $y$, which in turn is connected to a lever $z$, fulcrumed at $a'$, the parts being so arranged that when said lever is raised the valve will be closed and the supply of water cut off. The lever $z$ is connected by a rod $b'$ with a float $c'$, arranged in a cylinder $d'$, and as said cylinder is connected by a pipe or pipes $e'$ with the filtered-water chamber $a$ it will be seen that when the filtered water rises to a certain height the valve $w$ will be closed through the medium of the mechanism described and the feed of water to the filter will be stopped until a portion of the water is drawn from the chamber $a$, when the float $c'$ will move downwardly and the valve $w$ will again be opened. In this way the feed of water to the filter is regulated, and the filter is therefore given more time and is better enabled to purify the water before it is fed to the boiler.

In order to heat and boil the water, I contemplate utilizing the exhaust-steam from an engine. This steam is ordinarily impregnated with grease and oil, and in order to free the steam of the same I provide the oil and grease separator B, which has its opposite sides connected by pipes C D with an engine and the filter-casing A, respectively, and is provided with a glass E to indicate the amount of oil or grease collected in the separator, and with a drain-pipe F, having a cock G. Said separator has the pipes C D entering its opposite sides, as stated, and between said pipes are arranged the foraminated plates H, which are designed to permit the steam to pass from pipe C to pipe D, and yet catch or gather the oil and grease and permit the same to drip into the bottom of the separator. Said plates are removably placed in the separator B, so that they can be removed and cleaned when necessary, and in order to present a greater surface to the steam, so as to enable them to better gather the oil and grease, they are corrugated, as better shown in Figs. 2 and 3. It will also be perceived that by reason of the plates H being corrugated channels are formed which guide the collected oil directly to the bottom of the casing and prevent it from spreading over the plates and interfering with the operation thereof.

The pipe D enters the casing A above the filtering material, as shown, and it will therefore be seen that the steam and water will be thoroughly commingled in the space above the filtering material and in the pans $k\,k'$, and in consequence the water will not only be heated, which is obviously desirable, but will be boiled, which is also desirable, since it facilitates the separation of foreign matter from the water.

The exhaust-steam after passing through the water and commingling therewith passes out of the casing A through the pipe T, as shown in Fig. 1.

When my improved apparatus is employed, it will be observed that the water will be fed to the boiler in a purified and heated state, and it will therefore be seen that it is necessary to consume but a comparatively small amount of fuel to generate steam and that no incrustations will form on the boiler and therefore the boiler will last much longer and will be much more efficient than a boiler into which water is fed direct from a source of supply.

Having described my invention, what I claim is—

The water heating and purifying apparatus described, comprising the filter having the casing and a filtered water chamber at its bottom, a pan arranged above the water chamber and having openings in its bottom surrounded by walls of less height than its side wall, a body of filtering material arranged between the pan and filtered water chamber, a discharge pipe connected with said chamber, a water induction pipe communicating with the interior of the casing above the pan, a discharge pipe for steam communicating with the casing above the pan, a valve arranged in the water induction pipe, the lever $z$, connected with said valve, the cylinder $d'$, connected with the filtered water chamber, a float arranged in said cylinder and carried by a rod connected to the lever $z$, and the oil-separator having the casing provided with an opening in one side for connection with a source of steam supply and a discharge opening in its opposite side connected by a pipe with the filter casing at a point between the filtering material and the pan, and the plurality of foraminated plates disposed within the casing between the openings thereof and provided with a series of vertical corrugations, substantially as specified.

In testimony whereof I affix my signature in presence of two witnesses.

CHARLES H. SNYDER.

Witnesses:
JOHN F. GALSTER,
JUSTIN T. CONWAY.